United States Patent
Niederhaus et al.

(10) Patent No.: US 10,067,629 B2
(45) Date of Patent: Sep. 4, 2018

(54) MEASURING DEVICE AND MEASURING METHOD WITH TUTORIAL FUNCTION

(71) Applicant: Rohde & Schwarz GmbH & Co. KG, Munich (DE)

(72) Inventors: Madlena Niederhaus, Rosenheim (DE); Richard Dengler, Munich (DE); Thomas Braunstorfinger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 274 days.

(21) Appl. No.: 14/827,942

(22) Filed: Aug. 17, 2015

(65) Prior Publication Data
US 2017/0053556 A1  Feb. 23, 2017

(51) Int. Cl.
G06F 3/00  (2006.01)
G06F 3/0481  (2013.01)
G09B 5/02  (2006.01)

(52) U.S. Cl.
CPC ............ G06F 3/0481 (2013.01); G09B 5/02 (2013.01)

(58) Field of Classification Search
CPC .............. G06F 9/4448; G06F 9/45512; G06F 19/3456; G06F 19/3462; G06F 19/3468; G06F 21/6245; G06F 3/0484; G06F 17/30283; G06F 19/322
See application file for complete search history.

(56) References Cited

U.S. PATENT DOCUMENTS

| | | | | |
|---|---|---|---|---|
| 7,878,808 B1 * | 2/2011 | Stumm | ................. | G09B 5/12 434/118 |
| 8,029,447 B2 * | 10/2011 | Kanz | ................. | A61B 5/0006 600/481 |
| 2007/0094599 A1 | 4/2007 | Pellman et al. | | |
| 2013/0289920 A1 | 10/2013 | Braunstorfinger | | |
| 2014/0378079 A1 * | 12/2014 | Adnani | ................. | H04B 1/406 455/266 |
| 2016/0246467 A1 * | 8/2016 | Jemiolo | ............ | G06F 17/30312 |
| 2017/0197449 A1 * | 7/2017 | Singamsetty | .......... | B41J 29/393 |

FOREIGN PATENT DOCUMENTS

EP  1897492  11/2009

* cited by examiner

Primary Examiner — Di Xiao
(74) Attorney, Agent, or Firm — Lee & Hayes, PLLC (57) ABSTRACT

A measuring device according to a first aspect of the invention comprises a display unit, a remote control interface adapted to receive external remote control commands according to a remote control command format, a control unit adapted to control the measuring device according to said remote control commands, and a tutorial reproduction unit adapted to generate tutorial content commands according to said remote control command format and transmit said tutorial control commands to said remote control interface. The control unit is adapted to control said measuring device according to said tutorial control commands.

20 Claims, 6 Drawing Sheets

```
 1  <p><b>Goal:</b> Generating a simple WCDMA-3GPP (QPSK 45° Offset)
 2  signal with the help of the "Custom Digital Modulation" functionality.</p>
 3  <p><b>Required options</b>: R&S SMW base unit.</p>
 4  <p><b>Initial situation:</b>
 5  Configuration performed in tutorial "01_UnmodulatedSignal".</p>
 6  <p>Changed parameters are highlighted in orange.</p>
 7
 8  #!SCPI
 9  *RST
10  :DISPlay:DIALog:CLOSe:ALL
11
12  # Split long messages into parts
13  :DISPlay:MESSage 'To set the frequency: on the "Status Bar", tap the "A Freq" field.'
14  # Message cont.
15  :DISPlay:MESSage 'Enter 1.955 and press the "GHz" key.'
16  :SOURce1:FREQuency:CW 1955000000
17
18  :SOURce1:POWer:POWer -20
19
20  :DISPlay:MESSage 'In the block diagram, select "Baseband A".'
21  :DISPlay:MESSage 'Navigate to the section "Misc>Custom Digital Mod..." and select it.'
22  :DISPlay:DIALog:OPEN "BasebandDigitalModMain$q$$A$t0$x0$y146$h1$w1"
23
24  :DISPlay:MESSage 'Select "General>Set acc to standard>WCDMA-3GPP".'
25  :SOURce1:BB:DM:STANdard W3GP
26
27  :SOURce1:BB:DM:STATe 1
28  :DISPlay:DIALog:OPEN "BasebandDigitalModMain$q$$A$t5$x3$y146$h539$w888"
29  :DISPlay:DIALog:OPEN "BasebandDigitalModMain$q$$A$t0$x3$y146$h539$w888"
30  :DISPlay:DIALog:CLOSe "BasebandDigitalModMain$q$$A"
31  :OUTPut1:STATe 1
```

MEASURING DEVICE AND MEASURING METHOD WITH TUTORIAL FUNCTION

TECHNICAL FIELD

The invention relates to a measuring device and a measuring method, which use a graphical interface on a screen for controlling the measuring device.

BACKGROUND ART

With progressing technological advances, measuring devices have become increasingly complex. The manuals for measuring devices easily surpass thousands of pages. This leads to the problematic situation, in which an operator of a measuring device can hardly know all functions of the measuring device by heart. Repeatedly looking up functions of the measuring device in very lengthy manuals is time-consuming, though.

An exemplary measuring device with a graphical user interface is, for example, shown by document US 2013/0289920 A1.

In non-related technical fields, the display of tutorial content directly on a screen is known. For example, the document US 2007/0094599 A1 shows a paper folding machine having a graphical user interface. On a screen of the paper folding machine, a slide-show of tutorial content can be displayed.

Also document EP 1 897 492 B1 shows a device with a graphical user interface, which can display tutorial content. This document shows a blood analysis device. Also here, a slide-show of tutorial content can be displayed on a screen.

The solutions shown by these documents though are disadvantageous, since they require the storage of large amounts of tutorial data, since the tutorial is rendered as a bitmap slide-show on the screen. Each individual image of the slide-show therefore has to be recorded. Moreover, it is difficult and time-consuming to create additional tutorials, since this has to be done on an external computer and requires a great deal of graphics design skills.

SUMMARY OF THE INVENTION

A measuring device according to a first aspect of the invention comprises a display unit, a remote control interface adapted to receive external remote control commands according to a remote control command format, a control unit adapted to control the measuring device according to said remote control commands, and a tutorial reproduction unit adapted to generate tutorial content commands according to said remote control command format and transmit said tutorial control commands to said remote control interface. The control unit is adapted to control said measuring device according to said tutorial control commands. It is thereby possible to create tutorial content on the screen of the measuring device without having to store a large amount of data. The respective tutorial control commands and remote control commands only have a very low data amount.

Advantageously, said tutorial reproduction unit is adapted to generate said tutorial control commands for instructing said control unit to control measuring functions of said measuring device and/or to display tutorial content using the display unit. It is thereby possible to not only instruct the user by displaying tutorial content on the screen, but also by automatically changing according settings of the measuring device.

Advantageously, said tutorial content comprises control dialogs and/or highlights and/or explanatory texts. These highlights can for example comprise arrows and/or color highlights and/or brightness highlights and/or underlining and/or blinking elements and/or color changing elements and/or brightness changing elements. It is thereby possible to display a broad variety of content on the screen. A very flexible design of tutorials is thereby possible.

Advantageously, the control unit is adapted to control measuring functions of said measuring and/or to control said display unit to display control dialogs and tutorial content based upon said remote control commands and said tutorial control commands. By using the remote control interface for external remote control commands and internal tutorial control commands, a very simple construction of the measuring device is possible. No major changes have to be made, since the remote control interface is present for remote controlling the measuring device, anyway.

Further advantageously, the measuring device comprises a tutorial storage unit adapted to store tutorial files. Said tutorial reproduction unit is adapted to read said tutorial files from said tutorial storage unit and to generate said tutorial control commands based upon said tutorial files. It is thereby possible to have a repository of a great number of different tutorials explaining a plurality of different functions of the measuring device. This simplifies the use of the measuring device significantly.

Advantageously, said measuring device moreover comprises a tutorial generating unit adapted to generate said tutorial files by recording a plurality of commands inputs by a user in the tutorial storage unit. It is thereby possible to generate additional tutorials using only the measuring device. Alternatively, tutorials though can also be created using an external computer. For example, a tutorial editor on such a computer is possible. Also generating tutorials using merely a text-editor is an option.

Advantageously, the measuring device moreover comprises a tutorial editing unit adapted to read said tutorial files form said tutorial storage unit, alter said tutorial files by adding further command inputs and/or deleting and/or altering at least one of said command inputs and/or adding and/or altering and/or deleting explanatory texts and/or highlights and store said altered tutorial files into the tutorial storage unit. It is thereby very easily possible to adapt tutorials to special needs of a user. Instead of performing the amendments to the tutorial directly on the measuring device, also an editing of tutorial on a separate computer is possible. In this case, for example, the tutorial files can be copied from the measuring device, altered on an external computer, and then written back to the measuring device.

Advantageously, said remote control command format is the Standard Commands for Programmable Instruments—SCPI-format or ICE-format or USB-format or LAN-format or CAT-format. Since a great deal of measuring devices have a remote control interface according to this standard anyway, it is very simple to implement controlling tutorials using commands according to these formats.

According to a second aspect of the invention, a measuring method is provided. The method comprises receiving external remote control commands according to a remote control command format by a remote control interface of a measuring device, controlling said measuring device according to said remote control commands, generating tutorial control commands according to said remote control command format by said measuring device, and controlling said measuring device according to said tutorial control commands. It is thereby very easily possible to generate tutorial content on the measuring device. Especially only a very low amount of data is needed to do so.

According to a third aspect of the invention, a respective computer-readable medium is provided.

BRIEF DESCRIPTION OF THE DRAWINGS

An exemplary embodiment of the invention is now further explained, by way of example only, with respect to the drawings, in which.

DETAILED DESCRIPTION OF THE PREFERRED EMBODIMENTS

Figure 1:
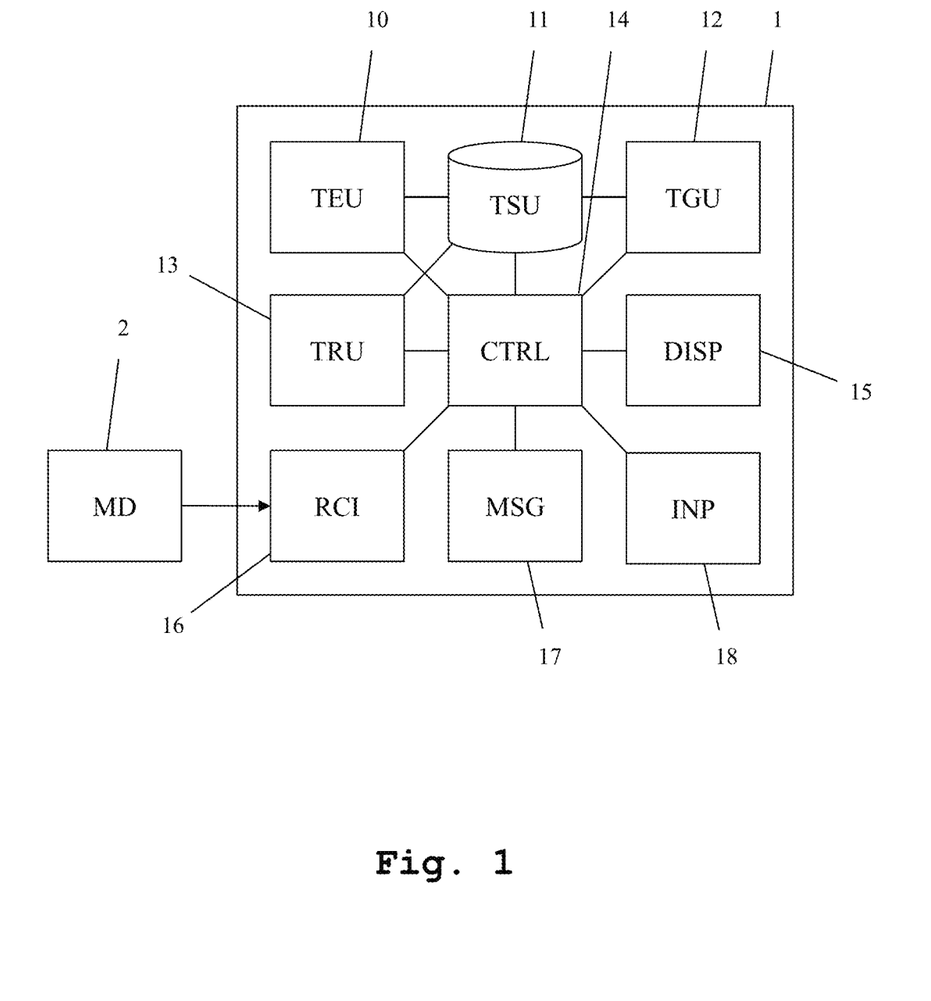
FIG. 1 shows a first embodiment of the inventive measuring device according to the first aspect of the invention.

First we demonstrate the general construction and function of an embodiment of the inventive measuring device according to the first aspect of the invention along FIG. 1. After this, along FIG. 2-FIG. 6, the detailed function of the measuring device is described along different exemplary screen contents. In FIG. 7, after this, the content of a tutorial file is shown. Finally, in FIG. 8, details of the function of an embodiment of the inventive measuring method according to second aspect of the invention are shown. Similar entities and reference numbers and different figures have been partially omitted.

Reference will now be made and detailed and preferred embodiments of the present invention, examples of which are illustrated in the accompanying drawings. However, the following embodiments of the present invention may be variously modified and the range of the present invention is not limited by the following embodiments.

First Embodiment

In FIG. 1, an exemplary embodiment of the first aspect of the invention is shown. A measuring device 1 comprises a tutorial editing unit 10, a tutorial storage unit 11, a tutorial generating unit 12, a tutorial reproduction unit 13, a control unit 14, a display unit 15, a remote control interface 16, a measuring unit 17, and an input unit 18. The control unit 14 is connected to all remaining units 10-13, 15-18, and controls them. Moreover, the tutorial storage unit 11 is connected to the tutorial editing unit 10, the tutorial generating unit 12 and the tutorial reproduction unit 13. The measuring device 1 is in contact to a further measuring device 2 through the remote control interface 16.

The measuring device 1 performs measurements using the measuring unit 17. The measuring unit 17 is controlled by the control unit 14. A user can control the measurements by use of the input unit 18. Control dialogs and measuring results are displayed by the display unit 15. In order to remotely control the measuring device 1, the measuring device 1 comprises the remote control interface 16, which is adapted to receive remote control commands according to a remote control command format, for example SCPI or ICE or USB or LAN or CAT. In this embodiment, the measuring device 1 is connected to a further measuring device 2, which provides remote control commands to the remote control interface 16 of the measuring device 1.

These remote control commands are received by the remote control interface 16 and handed to the control unit 14, which controls the measuring device 1 based upon the remote control commands and received by the remote control interface 16. Since the measuring device 1, and especially the control unit 14 are already adapted to receive and process remote control commands according to the remote control command format, it is very simple to implement the display of tutorials. The tutorial reproduction unit 13 generates tutorial control commands and hands them to the control unit 14. The tutorial control commands also follow the remote control command format. The control unit 14 then controls the measuring device according to the tutorial control commands. These tutorial control commands can instruct the measuring device to perform measuring functions but also to display tutorial content on the display unit 15. This tutorial content can for example be control dialogs and/or highlights and/or explanatory texts. In order to generate the tutorial control commands, the tutorial reproduction unit 13 can optionally read tutorial files from the tutorial storage unit 11. In each tutorial file, a single tutorial is stored. The tutorial consists of a number of tutorial control commands in the remote control command format.

Moreover, the tutorial generating unit 12 is adapted to generate tutorials and store them in the tutorial store unit 11. In order to generate a tutorial, the tutorial generating unit 12 records user inputs after a tutorial recording mode has been activated. These user inputs are stored as tutorial control commands in the remote control command format in the tutorial storage unit 11. Since during tutorial generation, it might happen that a command is entered accidentally, the thereby generated tutorials can be edited using the tutorial editing unit 10. Individual tutorial control commands can be added, amended or deleted from the respective tutorial file in the tutorial storage unit 11. Also, highlights and/or explanatory texts can be added.

It is important to note that the tutorial editing unit 10, the tutorial storage unit 11 and the tutorial generating unit 12 are only optional components of the measuring device. The tutorial reproduction unit 13 alone can already create tutorial content for display on the display device 15. Instead of generating, storing and editing the tutorials within the measuring device 1, all of these functions can also be performed externally, for example, by a computer or the processing unit of measuring device.

Figure 2:
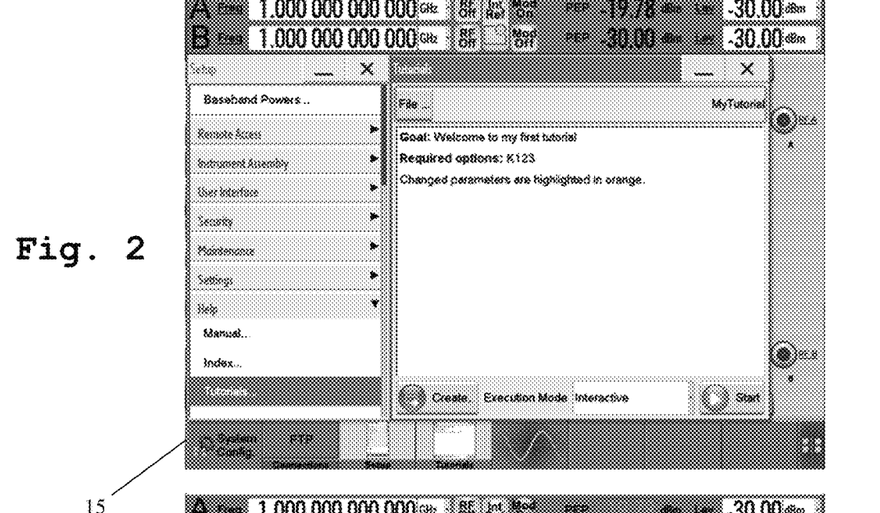
FIG. 2 shows a first exemplary screen content.

In FIG. 2, a first exemplary control dialog on the display unit 15 is shown. Here, the selection of a tutorial file is shown. By selecting one of the available tutorials and pressing Start using the input unit 18, a user can initiate the display of the respective tutorial.

Figure 3:
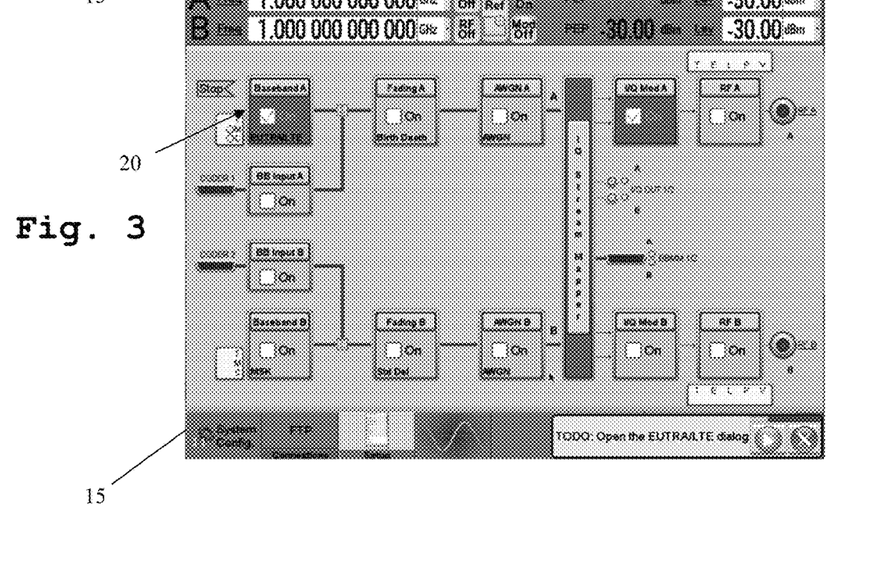
FIG. 3 shows a second exemplary screen content.

In FIG. 3, a further exemplary content of the screen 15 is shown. Here, the tutorial is in progress. In the lower right corner of the screen 15, tutorial control buttons are depicted. By pressing the X-symbol, the tutorial can be aborted. By pressing the arrow-symbol, the next step of the tutorial can be displayed. Moreover, here a highlight 20 in form of a color highlight is shown. Alternatively, a continuous display mode is possible, in which the next step is automatically activated after a pre-specified time. An automatic repetition of the entire tutorial is also possible.

Figure 4:
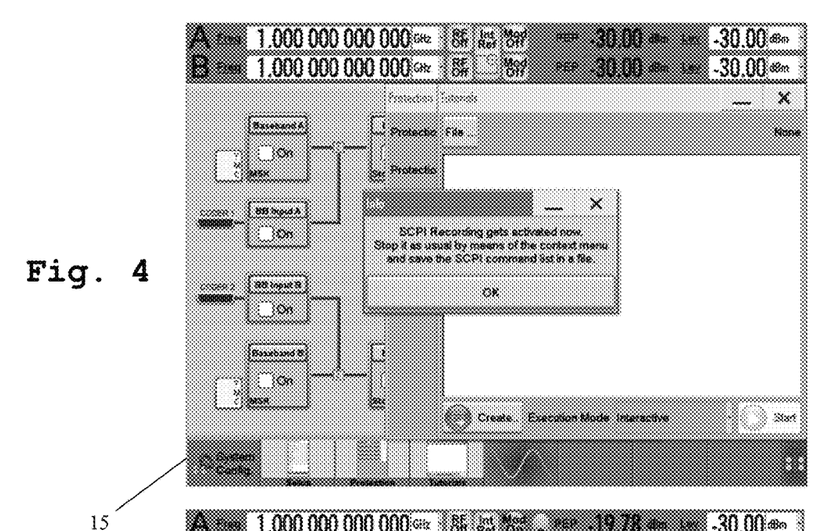
FIG. 4 shows a third exemplary screen content.

In FIG. 4, a further exemplary content of the screen 15 is shown. Here, a control dialog after activating tutorial recording is shown. This is the situation, when the tutorial generating unit 12 generates a tutorial.

Figure 5:
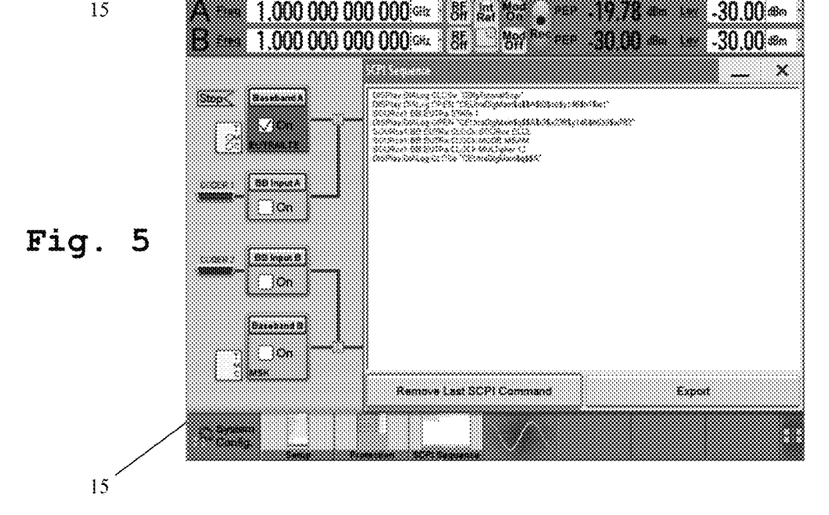
FIG. 5 shows a fourth exemplary screen content.

In FIG. 5, a further exemplary content of the screen 15 is shown. Here, a control dialog for editing the respective tutorial is shown. This corresponds to editing a tutorial by the tutorial editing unit 10. Here, especially a removal of a last SCPI command is possible. Also other functions, such as adding or amending recorded tutorial control commands, are possible. Here, additionally, the export of a thereby created tutorial file is offered. Further editing of the exported file on an external computer is thereby possible.

Figure 6:
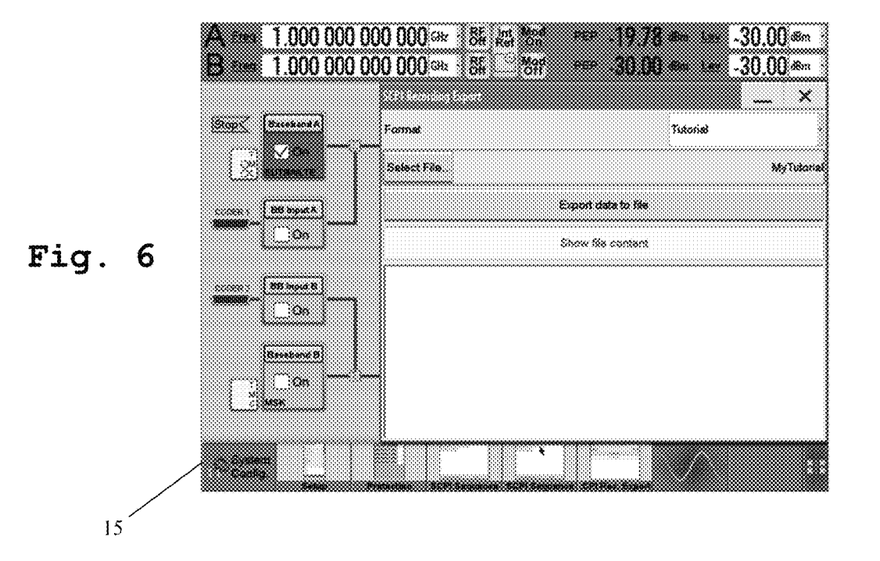
FIG. 6 shows a fifth exemplary screen content.
Figure 7:
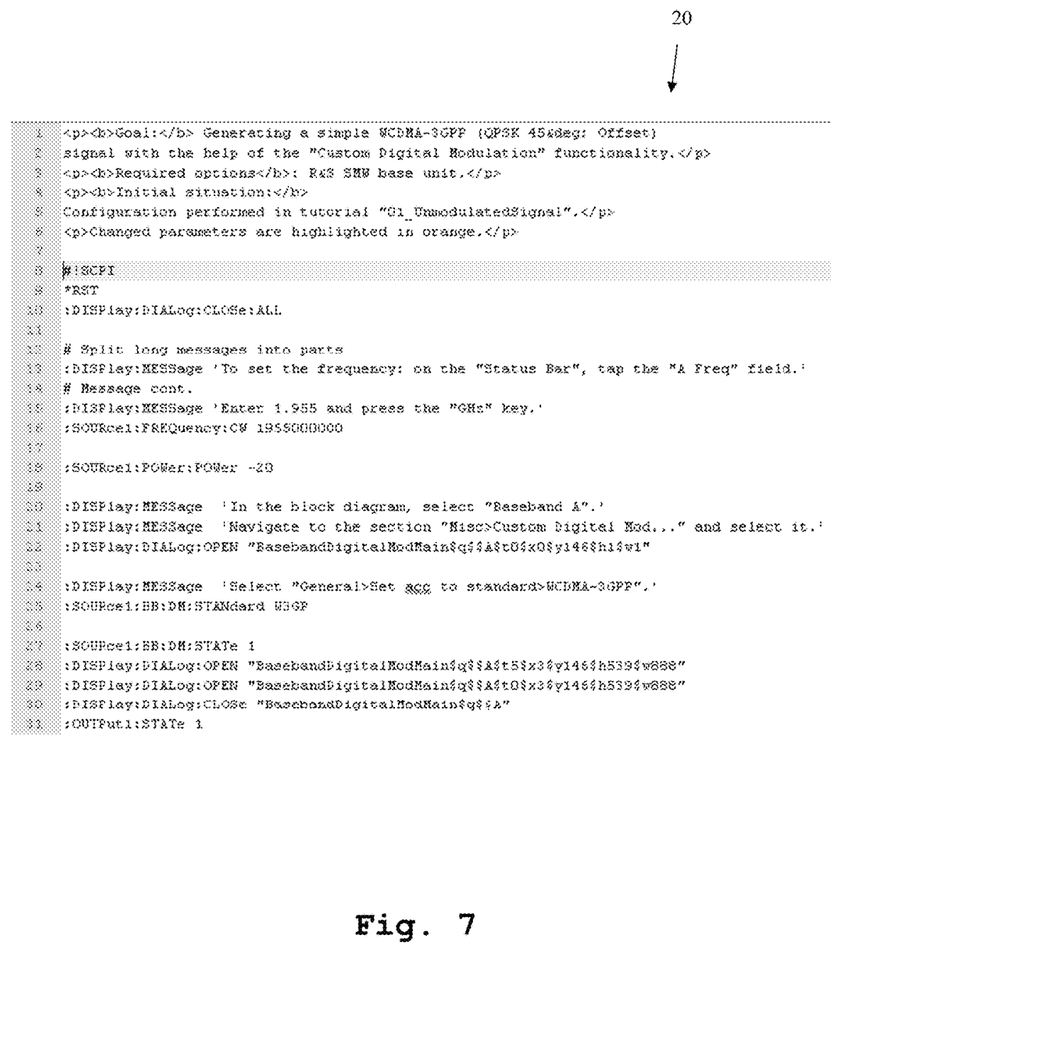
FIG. 7 shows an exemplary tutorial file.

In FIG. 6, a further exemplary content of the screen 15 is depicted. Here, a tutorial export dialog is shown.

In FIG. 7, the content of a tutorial file 20 is depicted. It can readily be seen that the tutorial file stores tutorial control commands, especially SCPI commands in a successive manner. By editing the tutorial file, the content of the respective tutorial can be amended.

Second Embodiment

Figure 8:
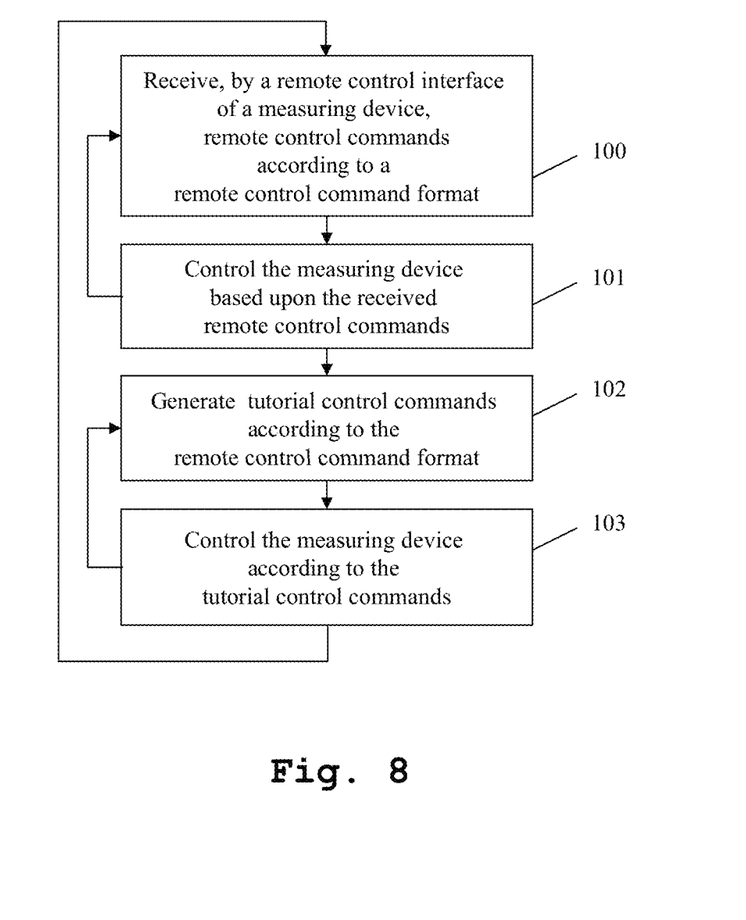
FIG. 8 shows an embodiment of the inventive measuring method according to the second aspect of the invention.

Finally, in FIG. 8, an exemplary embodiment of the inventive measuring method according to the second aspect of the invention is shown. In a first step 100, a remote control interface of a measuring device receives remote control commands according to a remote control command format from an external source. In a second step 101, the measuring device is controlled based upon the previously received remote control commands. These steps can be repeated indefinitely. In a third step 102, the measuring device itself, especially a tutorial generating unit, generates tutorial control commands according to the remote control command format. In a fourth step 103, the measuring device is controlled according to the previously generated tutorial control commands. Also the steps 102 and 103 can be repeated indefinitely. In addition, receiving external commands and generating tutorial control commands both can be repeated.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the specific measuring device depicted here. Any type of measuring device, for example, signal generators, network analyzers, logic analyzers, spectrum analyzers, etc. can be target of the invention. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A measuring device comprising
a display unit,
a remote control interface,
external remote control commands, the external remote control commands received via the remote control interface according to a remote control command format, said remote control commands received via the remote control interface from a further measuring device or a computer,
a controller configured to control the measuring device according to said remote control commands,
a tutorial reproducer configured to generate tutorial control commands according to said remote control command format and to transmit said tutorial control commands to said remote control interface,
an input unit, configured to allow a user to control measurements, wherein the input unit is different from the remote control interface, and
wherein said controller is configured to control said measuring device according to said tutorial control commands.

2. The measuring device according to claim 1,
wherein said tutorial reproducer is adapted to generate said tutorial control commands for instructing said controller to control measuring functions of said measuring device and/or to display tutorial content using the display unit.

3. The measuring device according to claim 2,
wherein said tutorial content comprises control dialogs, and/or highlights, and/or explanatory texts.

4. The measuring device according to claim 3,
wherein said highlights comprise arrows, and/or color highlights, and/or brightness highlights, and/or underlining, and/or blinking elements, and/or color changing elements, and/or brightness changing elements.

5. The measuring device according to claim 1,
wherein said controller is adapted
to control measuring functions of said measuring device, and/or
to control said display unit to display control dialogs and tutorial content,
based upon said remote control commands and said tutorial control commands.

6. The measuring device according to claim 1,
wherein said measuring device comprises a tutorial storage adapted to store tutorial files, and
wherein said tutorial reproducer is adapted to read said tutorial files from said tutorial storage and to generate said tutorial control commands based upon said tutorial files.

7. The measuring device according to claim 6,
wherein said measuring device comprises a tutorial generator adapted to generate said tutorial files by recording a plurality of command inputs of a user in the tutorial storage.

8. The measuring device according to claim 7,
wherein said measuring device comprises a tutorial editor adapted to
read said tutorial files from said tutorial storage,
alter said tutorial files by adding further command inputs, and/or deleting and/or altering at least one of said command inputs, and/or adding, and/or altering, and/or deleting explanatory texts and/or highlights, and
store said altered tutorial files in said tutorial storage.

9. The measuring device according to claim 1,
wherein said remote control command format is the Standard Commands for Programmable Instruments—SCPI-format or ICE-format or USB-format or LAN-format or CAT-format.

10. A measuring method comprising the steps
receiving external remote control commands according to a remote control command format, by a remote control interface of a measuring device, said remote control commands received from a further measuring device or computer means,
controlling said measuring device according to said remote control commands,
generating tutorial control commands according to said remote control command format by said measuring device,
controlling measurements by a user through an input unit, different from the remote control interface, and
controlling said measuring device according to said tutorial control commands.

11. The measuring method according to claim 10,
wherein said method comprises generating said tutorial control commands for instructing said measuring device to control measuring functions of said measuring device and/or to display tutorial content using a display unit of the measuring device.

12. The measuring method according to claim 11,
wherein said tutorial content comprises control dialogs, and/or highlights, and/or explanatory texts.

13. The measuring method according to claim 12,
wherein said highlights comprise arrows, and/or color highlights, and/or brightness highlights, and/or underlining, and/or blinking elements, and/or color changing elements, and/or brightness changing elements.

14. The measuring method according to claim 10,
wherein said method comprises
controlling measuring functions of said measuring device, and/or
controlling said display unit to display control dialogs and tutorial content,
based upon said remote control commands and said tutorial control commands.

15. The measuring method according to claim 10,
wherein the method comprises transmitting said remote control commands to said remote control interface of said measuring device by the further measuring device or the computer means.

16. The measuring method according to claim 10,
wherein said method comprises
storing tutorial files using a tutorial storage of the measuring device, and
reading said tutorial files from said tutorial storage, and generating said tutorial control commands based upon said tutorial files.

17. The measuring method according to claim 16,
wherein said measuring method comprises generating said tutorial files by recording a plurality of command inputs of a user in the tutorial storage.

18. The measuring method according to claim 17,
wherein said measuring method comprises
reading said tutorial files from said tutorial storage,
altering said tutorial files by adding further command inputs, and/or deleting and/or altering at least one of said command inputs, and/or adding, and/or altering, and/or deleting explanatory texts and/or highlights, and
storing said altered tutorial files in said tutorial storage.

19. The measuring method according to claim 10,
wherein said remote control command format is the Standard Commands for Programmable Instruments—SCPI-format or ICE-format or USB format or LAN-format or CAT-format.

20. One or more non-transitory computer-readable media storing computer-executable instructions that, when executed on one or more processors, configure a computer to performs operations comprising:
receiving external remote control commands according to a remote control command format, by a remote control interface of a measuring device,
controlling said measuring device according to said remote control commands,
generating tutorial control commands according to said remote control command format by said measuring device,
controlling measurements by a user through an input unit, different from the remote control interface, and
controlling said measuring device according to said tutorial control commands.

* * * * *